(12) United States Patent
Jansen et al.

(10) Patent No.: US 10,293,651 B2
(45) Date of Patent: May 21, 2019

(54) SUSPENSION LINK ELEMENT

(71) Applicant: SAF-HOLLAND GmbH, Bessenbach (DE)

(72) Inventors: Roger Jansen, Holton, MI (US); Gregory Galazin, Muskegon, MI (US)

(73) Assignee: SAF-HOLLAND GmbH, Bessenbach (DE)

( * ) Notice: Subject to any disclaimer, the term of this patent is extended or adjusted under 35 U.S.C. 154(b) by 121 days.

(21) Appl. No.: 15/510,105

(22) PCT Filed: Sep. 7, 2015

(86) PCT No.: PCT/EP2015/070373
§ 371 (c)(1),
(2) Date: Mar. 9, 2017

(87) PCT Pub. No.: WO2016/037974
PCT Pub. Date: Mar. 17, 2016

(65) Prior Publication Data
US 2017/0259634 A1 Sep. 14, 2017

(30) Foreign Application Priority Data
Sep. 12, 2014 (DE) .......................... 10 2014 218 315

(51) Int. Cl.
*B60G 7/00* (2006.01)
(52) U.S. Cl.
CPC .......... *B60G 7/001* (2013.01); *B60G 2200/22* (2013.01); *B60G 2200/31* (2013.01);
(Continued)

(58) Field of Classification Search
CPC .............. B60G 7/001; B60G 2300/026; B60G 2206/8201; B60G 2206/8101;
(Continued)

(56) References Cited

U.S. PATENT DOCUMENTS

| 5,639,110 A * | 6/1997 | Pierce .................... | B60G 7/001 |
| | | | 280/124.11 |
| 7,484,744 B2 * | 2/2009 | Galazin .................. | B60G 9/003 |
| | | | 280/124.116 |

(Continued)

FOREIGN PATENT DOCUMENTS

| DE | 10110492 | 9/2002 |
| DE | 602004006080 | 12/2007 |

(Continued)

OTHER PUBLICATIONS

European Patent Office; International Search Report, dated Sep. 24, 2015.

*Primary Examiner* — Darlene P Condra
(74) *Attorney, Agent, or Firm* — Price Heneveld LLP (57) ABSTRACT

Relates to a link element, in particular for use in utility vehicles, comprising a first wall region, a second wall region and a third wall region, wherein the link element has a pivot region for pivotable support about a pivot axis, wherein the first wall region and the second wall region extend substantially parallel with a transverse plane, wherein the transverse plane is orthogonal to the pivot axis, wherein the third wall region protrudes along a lateral plane from the first wall region and/or from the second wall region, wherein the lateral plane is orientated perpendicularly to the transverse plane, wherein the third wall region is arranged parallel with the transverse plane eccentrically with respect to the extent of the first wall region and/or the second wall region.

18 Claims, 4 Drawing Sheets

(52) U.S. Cl.
CPC .. *B60G 2204/148* (2013.01); *B60G 2206/014* (2013.01); *B60G 2206/11* (2013.01); *B60G 2206/16* (2013.01); *B60G 2206/8101* (2013.01); *B60G 2206/8201* (2013.01); *B60G 2300/026* (2013.01)

(58) Field of Classification Search
CPC .......... B60G 2206/16; B60G 2206/014; B60G 2204/148; B60G 2200/31; B60G 2200/22; B60G 2206/11
See application file for complete search history.

(56) References Cited

U.S. PATENT DOCUMENTS

| | | | |
|---|---|---|---|
| 2006/0181047 A1* | 8/2006 | Chamberlin | B60G 7/001 |
| | | | 280/124.128 |
| 2008/0029988 A1 | 2/2008 | Saieg et al. | |
| 2008/0224435 A1 | 9/2008 | Holt | |
| 2014/0015214 A1* | 1/2014 | Galazin | B60G 9/003 |
| | | | 280/124.128 |
| 2015/0008654 A1* | 1/2015 | Haselhorst | B60G 7/001 |
| | | | 280/124.128 |
| 2016/0167472 A1* | 6/2016 | Meyer | B60G 11/16 |
| | | | 280/124.125 |

FOREIGN PATENT DOCUMENTS

| | | |
|---|---|---|
| DE | 202011000609 | 8/2012 |
| DE | 102011053222 | 3/2013 |
| EP | 1368205 | 12/2003 |
| JP | H03287404 | 12/1991 |
| WO | 2015093346 | 6/2015 |

* cited by examiner

SUSPENSION LINK ELEMENT

BACKGROUND OF THE INVENTION

The present invention relates to a link element, in particular for use in utility vehicles.

Link elements are known from the prior art. In this case, longitudinal links which are suspended in a pivotable manner and which are constructed in a substantially bar-like manner act as a bearing for an axle or a stub axle of a utility vehicle chassis. Those longitudinal links are pivotably fixed at the first distal end thereof to the frame of a utility vehicle and are provided at the end thereof opposite the pivotable end with a carrier portion for a resilient element, wherein an axle tube or a suspension for a vehicle wheel is generally arranged between the pivotable bearing and the resilient element. In the link elements which are known from the prior art, however, it has been found to be disadvantageous that, in order to achieve the necessary flexural strength, great wall thicknesses of the corresponding portions of the link element have to be provided and consequently the weight of the link element is very high in order to achieve a predetermined strength with respect to bending or torsion. Furthermore, the link elements which are known from the prior art are not suitable in terms of the geometric configuration thereof for fitting additional components of the chassis. Therefore, there is a need for improvement with regard to the optimum geometric configuration of link elements and optimization of the ratio of the strength to the weight of the link element.

An object of the present invention is to provide a link element which, on the one hand, has an optimum geometric construction and, on the other hand, allows a reduced weight while maintaining the necessary strength.

SUMMARY OF THE INVENTION

The link element comprises according to the invention a first wall region, a second wall region and a third wall region, wherein the link element has a pivot region for pivotable support about a pivot axis, wherein the first wall region and the second wall region have a main extent which extends substantially parallel with a transverse plane, wherein the transverse plane is orthogonal to the pivot axis, wherein the third wall region protrudes substantially along a lateral plane from the first wall region and/or from the second wall region, wherein the lateral plane is orientated perpendicularly to the transverse plane, wherein the third wall region is arranged parallel with the transverse plane eccentrically with respect to the extent of the first wall region and/or the second wall region. The main extent of the first and second wall regions substantially parallel with or along the transverse plane means in other words that the first and second wall regions have their greatest extent along or parallel with a transverse plane. In a state transverse to the transverse plane, the respective extent of the first and/or second wall region is preferably substantially smaller than the main extent, particularly preferably less than a quarter of the main extent parallel with the transverse plane. The extent of the first and second wall regions parallel with the transverse plane preferably does not mean in this instance that the first and/or second wall region also have to be constructed parallel with the transverse plane. Instead, it is preferable for the first and/or second wall region to have a curvature with which they deviate from the construction parallel with the transverse plane. In this instance, although the wall regions may have a given curvature, it is preferable for the maximum deviation of the first and/or the second wall region from a mean extent of the respective wall region parallel with the transverse plane not to exceed from 0.1 to 0.2 times the extent of the respective wall region parallel with the line of intersection between the lateral plane and the transverse plane. In other words, a possible radius of curvature of a wall region is substantially greater than the maximum extent of the wall region. In this case, the radius of curvature is preferably from 5 times to 10 times the maximum extent of the wall region parallel with the line of intersection of the lateral plane and transverse plane. The extent of the first and/or second wall region transversely to the transverse direction is in other words preferably the wall thickness of the respective wall region. The first and second wall regions are preferably orientated substantially parallel with each other, wherein a curvature of the first or second wall region is preferably provided in the context of this substantially parallel construction of the first and/or second wall region. Advantageously, the third wall region extends between the first and the second wall regions, wherein the third wall region extends substantially transversely relative to the transverse plane and consequently preferably transversely relative to the first and/or second wall region. An extent of the third wall region substantially along the lateral plane also includes a curvature of the third wall region, wherein the main extent direction of the third wall region preferably extends along or parallel with the lateral plane. The first, second and third wall regions consequently preferably form an H-shaped cross-section, but wherein the transverse bar of the H is arranged eccentrically relative to the two perpendicular bars of the H. The eccentric arrangement of the third wall region on the first and/or second wall region advantageously allows optimized exploitation of the structural space on the link element. Preferably, a shock absorber can be arranged on and secured to the link element in the region which is free as a result of the eccentric arrangement of the third wall region between the first and second wall regions. Furthermore, the eccentric arrangement of the third wall region on the first and/or second wall region optimizes the geometrical moment of inertia of the link element so that, for the same or less weight of the link element, higher bending moments can be taken up by the link element and can be transmitted to the frame or the axle of the utility vehicle.

In a particularly preferable manner, the first wall region extends at a first height parallel with the transverse plane, wherein the second wall region extends parallel with the transverse plane at a second height, wherein the third wall region is arranged at from 0.1 to 0.45 times, preferably from 0.15 to 0.3 times and particularly preferably at approximately 0.2 times the first height or the second height on the first wall region and/or the second wall region. In the context of the present invention, therefore, the third wall region is not intended to be arranged at half of the first and/or second height which would be equivalent to a central arrangement of the third wall region on the first and/or second wall region. The absolute height of the first and/or second wall region can preferably vary over the extent along the link element from the pivot axis, wherein the mean values of the respective heights of the first and/or second wall region over the extent along the link element are considered to be the first height and the second height. The first height is preferably equal to the second height because an advantageously uniform geometrical moment of inertia on the first and second wall regions can thereby be achieved and bending stress is taken up without the occurrence of torsion. The height of the first and second wall regions is preferably measured perpendicularly to the lateral plane and parallel with the transverse plane. The arrangement of the third wall region at approximately a quarter of the height of the first and/or second wall region allows, on the one hand, the exploitation of the particularly favorable geometrical moment of inertia of an approximately H-shaped cross-section. On the other hand, a free space is kept free over approximately three-quarters of the height of the first and/or second wall region in order to fix additional components to the link element between the first and second wall regions. In this case, the particularly preferred ratio range from approximately 0.2 times the height of the first and/or second wall region had the best values with respect to a high flexural strength with low weight and optimum distribution of structural space on the link element in tests by the Applicant.

In a particularly preferred manner, the third wall region extends at a third height parallel with the transverse plane. The third height of the third wall region is preferably measured perpendicularly to the lateral plane and is preferably in other words the wall thickness of the third wall region. In this instance, the mean height or the mean wall thickness of the third wall region is preferably defined as the third height, and is the mean value of an optionally variable thickness or third height of the third wall region in an extent parallel with the lateral plane. By the third height being kept in a ratio of from 0.01 to 0.2 to the first height and/or the second height, in particular the geometrical moment of inertia which acts during bending and torsion of the link element can be kept sufficiently great while at the same time the weight is minimized. The particularly preferred range from 0.05 to 0.15 allows a favorable distribution of the forces and moments which act on the wall regions and which are taken up by the link element, wherein at the same time an optimum exploitation of the structural space is also possible between the first and second wall regions. The particularly preferred range approximately from 0.08 to 0.1 disclosed the best values in tests by the Applicant with respect to the flexural rigidity and the weight which is simultaneously optimized.

In a particularly preferable manner, the link element has an upper side, a lower side and a receiving region in order to fix an axle tube, wherein the upper side and the lower side are arranged on the link element in such a manner that the direction of the force acting from the axle tube on the link element extends substantially from the lower side to the upper side, wherein the third wall region is arranged nearer the lower side of the link element than the upper side thereof. The force transmitted from the axle tube to the link element is preferably the supporting force of the wheels which are fixed to the axle tube and which carry the utility vehicle via the axle tube and the link element. The force transmitted from the wheels to the utility vehicle consequently acts substantially and in a normal operating state of the utility vehicle counter to gravitational force. Preferably, the link element is arranged on the utility vehicle in such a manner that the lower side thereof is directed toward the ground on which the utility vehicle is travelling. The upper side of the link element is preferably directed toward the frame of the utility vehicle. In particular not a utility vehicle in the raised state, such as, for example, during loading of the utility vehicle, is defined as the normal operating state of the utility vehicle. In a particularly preferable manner, the third wall region is arranged nearer the lower side of the link element in order to keep free, above the third wall region, a structural space which is as large as possible and which is suitable for fitting additional components to the link element.

In a particularly preferable manner, the third wall region has a recess which extends substantially along the lateral plane. The recess in the third wall region is used in particular to reduce the weight of the link element. In this case, the recess is preferably arranged in such a manner that the remaining regions of the third wall region have a geometry which is optimized in terms of force transmission path. In particular, the recess is preferably constructed in a rounded manner. In a particularly preferred manner, the recess can be constructed to be at least partially elliptical.

The recess preferably has a maximum recess extent parallel with the pivot axis, wherein the first wall region and the second wall region in the region of the maximum recess extent have a mean wall spacing from each other, wherein the maximum recess extent is in a ratio of from 0.4 to 0.9, preferably from 0.6 to 0.8 and particularly preferably from approximately 0.75 to 0.8 to the wall spacing. In a particularly preferable manner, the wall spacing is measured in this case parallel with the pivot axis and in a particularly preferable manner with the same spacing from the pivot axis as the recess extent. In other words, the recess extent and the wall spacing are preferably measured at the same height and in a particularly preferable manner in a collinear manner relative to each other. In this case, the greater the recess extent is, the greater is the weakening of the material of the third wall region as a result, and consequently of the link element. At the same time, the weight of the link element is reduced with a greater extent of the recess. In this case, the range preferred in the context of the present invention from 0.4 to 0.9 includes all the compromises established as being advantageous in the context of the present invention between a weight saving and adequate strength of the link element. In the particularly preferred ratio range from 0.6 to 0.8, it has been found during tests by the Applicant that the remaining material thickness of the third wall region is sufficient and at the same time the weight of the link element in comparison with link elements known from the prior art can be substantially reduced. The particularly preferred ratio range from 0.75 to 0.8 allows use of the link element according to the invention in particularly highly loaded utility vehicles in which an adequate strength of the link element has to be available and at the same time the weight is intended to be kept low.

In a preferred embodiment, the first wall region partially has a curvature, wherein a first extent plane is arranged parallel with the transverse plane in such a manner that a first maximum deviation of the first wall region from the first extent plane is minimized, wherein the first maximum deviation is in a ratio of from 0.05 to 0.3, preferably from 0.1 to 0.3 and particularly preferably of approximately 0.15 to a maximum total extent of the link element parallel with the pivot axis. In particular in order to adapt the link element optimally to the structural space present in the region of the chassis of the utility vehicle, the first wall region preferably partially has a curvature. In this case, the maximum spacing, in other words the first maximum deviation, of the first wall region from a first extent plane is defined as the measurement for the curvature of the first wall region. The first extent plane is preferably the plane which extends parallel with the transverse plane and which is arranged in such a manner that it intersects with the largest possible portion of the first wall region or is aligned therewith. Consequently, the first extent plane preferably extends congruently with respect to the mean extent of the first wall region. This position of the first extent plane makes it possible for the first maximum deviation to have values which are as small as possible, whereby the first extent plane preferably intersects with the largest portion of the first wall region. The maximum total extent of the link element parallel with the pivot axis is preferably the maximum width of the link element. As a result of configuring the first maximum deviation in a ratio of from 0.05 to 0.3 to the maximum total extent of the link element, the curvature of the first wall region is preferably constructed in such a manner that excessively large bending moments do not act about the longitudinal axis of the link element. The preferred range from 0.1 to 0.3 allows adequate design freedom during the configuration of the curvature of the link element and at the same time ensures sufficiently great strength of the link element by avoiding bending moments which occur transversely relative to the link element. The particularly preferred ratio of approximately 0.15 allows a curvature of the first wall region so that an optimum force transmission path is possible from the pivotable bearing of the link element in the direction toward the receiving region for an axle tube and at the same time the structural space in the chassis region is optimally utilized by the link element.

In a further preferred embodiment, the second wall region partially has a curvature, wherein a second extent plane is arranged parallel with the transverse plane in such a manner that a second maximum deviation of the second wall region from the second extent plane is minimized, wherein the second maximum deviation is in a ratio of from 0.05 to 0.3, preferably from 0.1 to 0.3 and particularly preferably of approximately 0.15 to a maximum total extent of the link element parallel with the pivot axis. In particular in order to adapt the link element optimally to the structural space present in the region of the chassis of the utility vehicle, the second wall region preferably partially has a curvature. In this case, the maximum spacing, in other words the second maximum deviation, of the second wall region from a second extent plane is defined as the measurement for the curvature of the second wall region. The second extent plane is preferably the plane which extends parallel with the transverse plane and which is arranged in such a manner that it intersects with the largest possible portion of the second wall region or is aligned therewith. Consequently, the second extent plane preferably extends congruently with respect to the mean extent of the second wall region. Consequently, the maximum total extent of the link element parallel with the pivot axis is preferably the maximum width of the link element. In order to further define the second extent plane and the second maximum deviation, the explanations in relation to the first extent plane and the maximum first deviation can be applied similarly. As a result of configuring the second maximum deviation in a ratio of from 0.05 to 0.3 to the maximum total extent of the link element, the curvature of the second wall region is preferably constructed in such a manner that excessively large bending moments do not act about the longitudinal axis of the link element. The preferred range from 0.1 to 0.3 allows adequate design freedom during the configuration of the curvature of the link element and at the same time ensures sufficiently great strength of the link element by avoiding bending moments which occur transversely relative to the link element. The particularly preferred ratio of approximately 0.15 allows a curvature of the second wall region so that an optimum force transmission path is possible from the pivotable bearing of the link element in the direction toward the receiving region for an axle tube and at the same time the structural space in the chassis region is optimally utilized by the link element.

In a particularly preferred manner, the pivot region, the first wall region, the second wall region and the third wall region are constructed integrally and are preferably constructed in one method step with each other. In a particularly preferred manner, a casting method is suitable as a production method for the link element, wherein the entire link element can preferably be produced in one method step. It is thereby possible to save in a particularly preferred manner production costs and to reduce the production time. The first, second and third wall regions can consequently be constructed as an integral cast component.

In a particularly preferred manner, the link element has a joint region which is constructed as a recess for fixing an axle tube in a materially engaging manner, wherein the joint region is provided at the end of the link element opposite the pivot region. The joint region is preferably an eye-like or aperture-like recess in the link element which extends substantially transversely relative to the transverse plane. In the joint region, it is preferably possible to fix the axle tube to the link element in a materially engaging manner by means of a peripheral weld seam.

BRIEF DESCRIPTION OF THE DRAWINGS

Additional advantages and features will be appreciated from the following description of selected embodiments with reference to the appended Figures. Naturally, individual features which are disclosed in selected Figures may also be used in embodiments of other Figures unless this is explicitly excluded or is forbidden as a result of technical considerations. In the drawings.

DETAILED DESCRIPTION OF THE PREFERRED EMBODIMENTS

Figure 1:
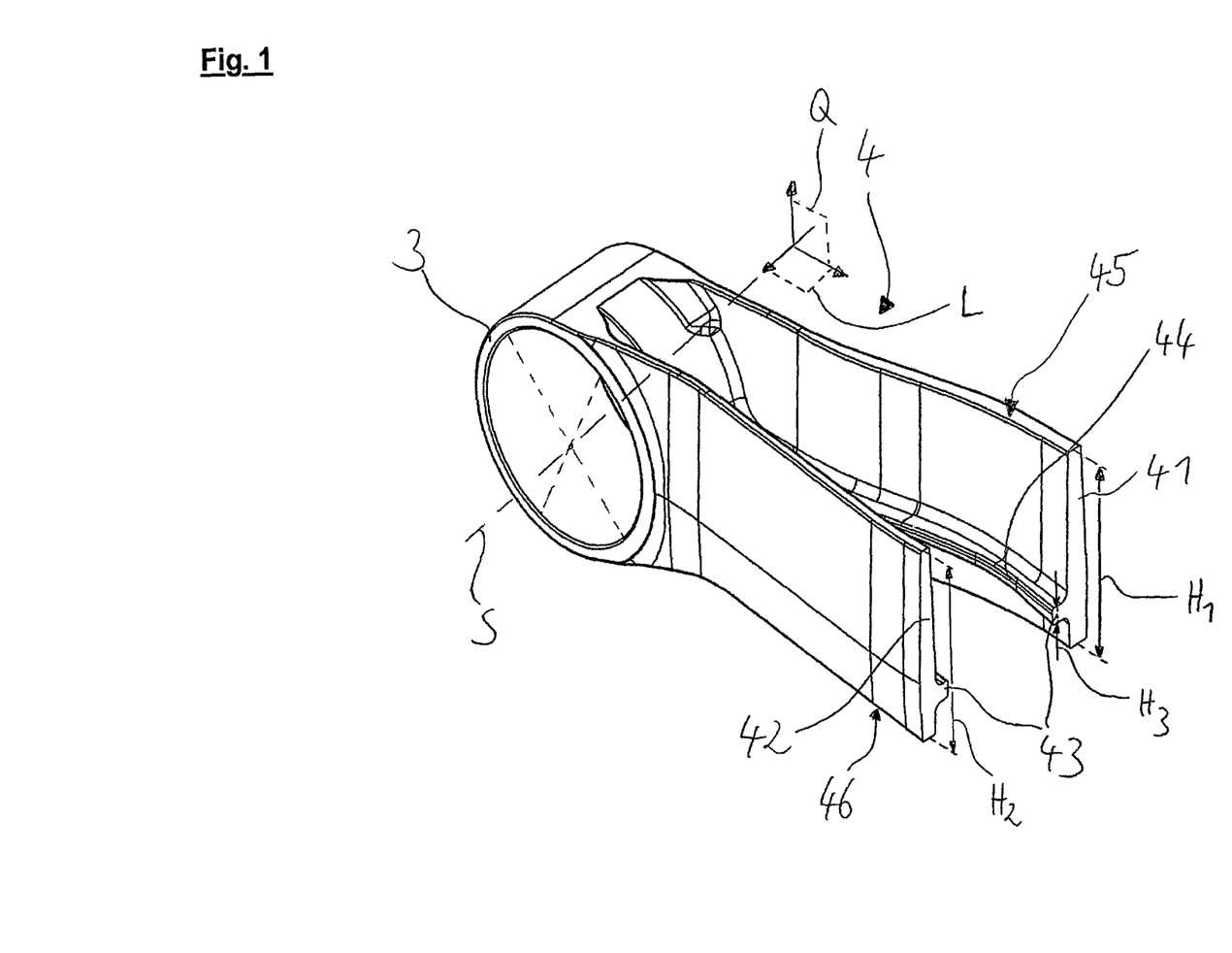
FIG. 1 is a perspective partially sectioned view of a preferred embodiment of the link element according to the invention.

The link element 4 shown in a first preferred embodiment in FIG. 1 has a pivot region 3 which is preferably constructed as a bearing eye and which allows pivotable support of the link element 4 about a pivot axis S. In a state adjacent to the pivot region 3, the link element 4 has a first wall region 41, a second wall region 42 and a third wall region 43. The first wall region 41 and the second wall region 42 extend substantially along or parallel with a transverse plane Q which is perpendicular to the pivot axis S. The first wall region 41 and the second wall region are spaced apart from each other, wherein the spacing between the first and second wall regions 41, 42 varies as a result of a preferred curvature of the first wall region 41 and/or the second wall region 42. Preferably, the first and second wall regions 41, 42 are spaced apart from each other by a mean wall spacing B (see FIG. 2 and FIG. 4). The third wall region 43 extends substantially along or parallel with a lateral plane L and consequently preferably substantially transversely or preferably perpendicularly to the first wall region 41 and/or the second wall region 42. In the region of the plane of section in FIG. 1, the third wall region 43 has a recess 44. Furthermore, the third wall region 43 is not arranged at half of the height of the first and/or second wall region 41, 42. In other words, the third wall region 43 is arranged at less than half the first height $H_1$ and/or half the second height $H_2$ on the first wall region 41 and the second wall region 42 and connected thereto, preferably integrally. In the preferred embodiment of FIG. 1, the third wall region 43 is arranged nearer the lower side 46 of the link element 4 than the upper side 45 thereof. There is preferably released above the third wall region 43 and between the first and second wall regions 41, 42 a large structural space for fixing additional components to the link element 4. Furthermore, the link element 4 with this H-like cross-section is adapted in a particularly effective manner to the acting bending moments. The third wall region 43 has a preferred third height $H_3$ which in other words is the wall thickness thereof or preferably the extent transversely to the lateral plane L. The third height $H_3$ is preferably approximately 0.09 times the first height $H_1$ and/or the second height $H_2$.

Figure 2:
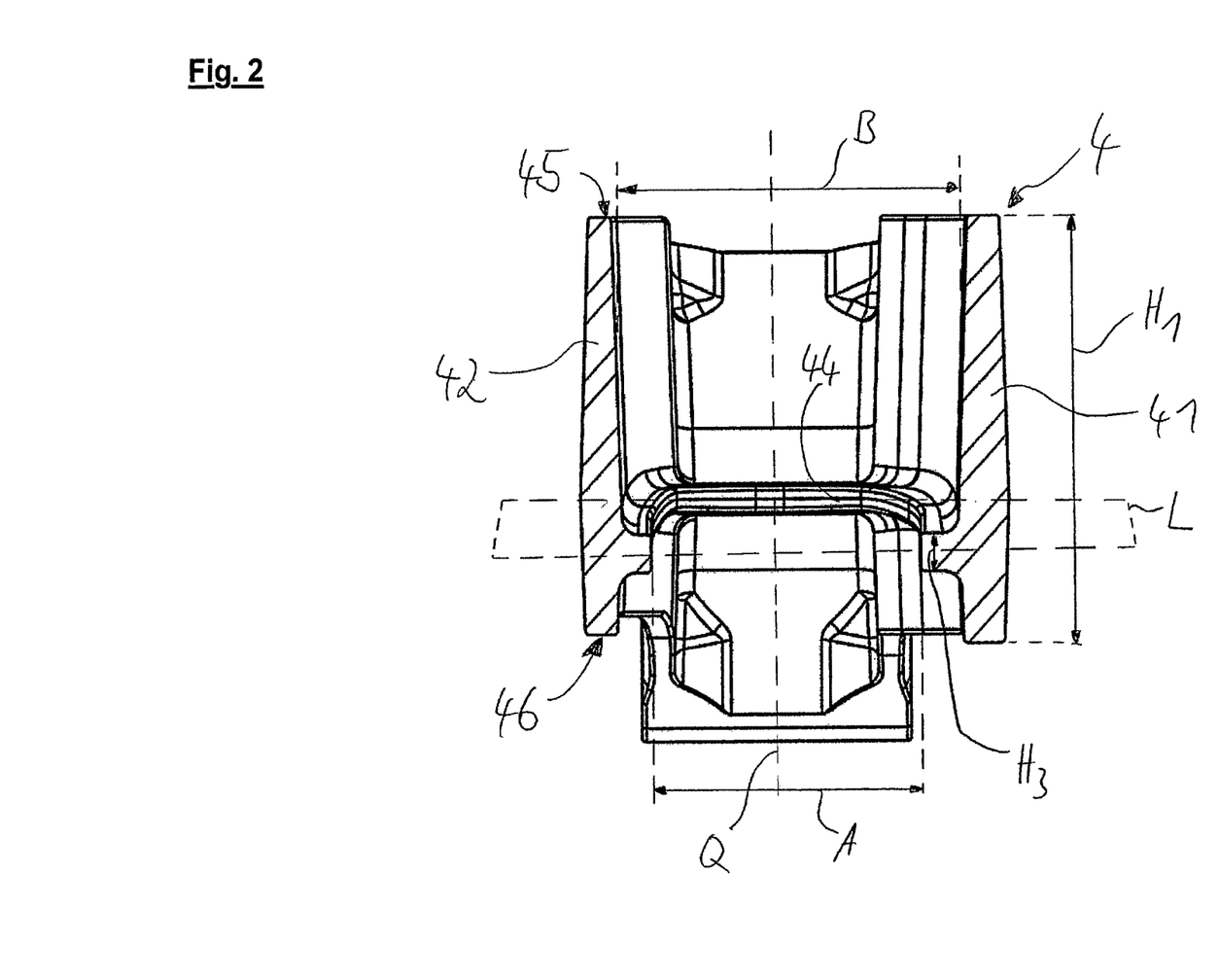
FIG. 2 is a cross-section of a preferred embodiment of the link element according to the invention.

FIG. 2 is a cross-section of a preferred embodiment of the link element 4. In this case, the plane of section is in the region of the link element 4 in which the third wall region has a recess 44 and particularly preferably at the height of the maximum recess extent A. In the preferred embodiment shown in FIG. 2, the recess extent A is at a ratio of approximately from 0.75 to 0.8 to the mean wall spacing B of the first and second wall regions 41, 42 from each other. Preferably, the upper side 45 of the link element 4 is orientated substantially parallel with the lower side 46, wherein in a particularly preferable manner the lateral plane L is not orientated parallel with the upper side 45 and lower side 46 but instead so as to be slightly pivoted. Consequently, the third wall region 43 also preferably extends through an angle of from 1° to 10° in a state pivoted relative to the upper side 45 and/or lower side 46 of the link element 4.

Figure 3:
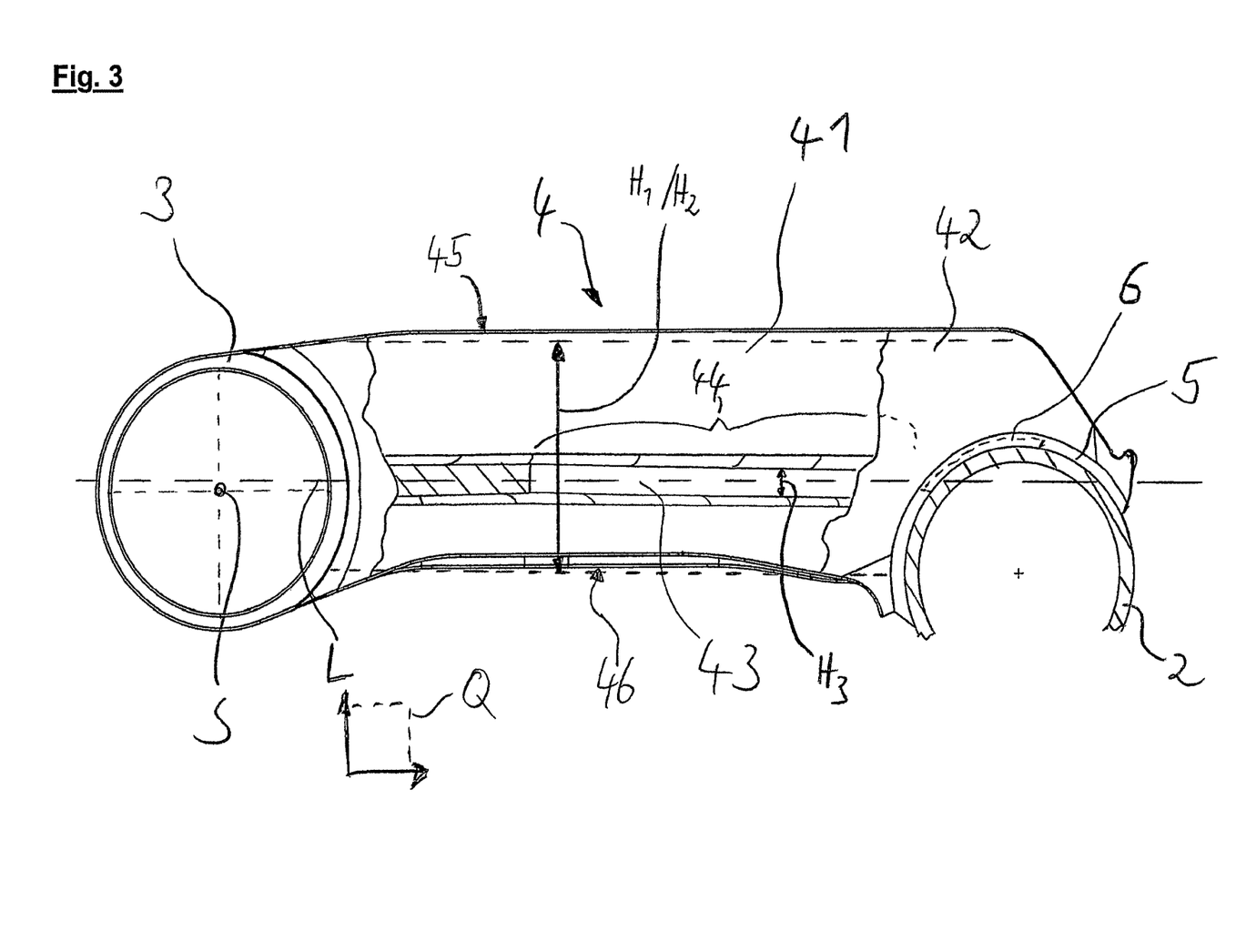
FIG. 3 is a side view of a preferred embodiment of the link element according to the invention.

FIG. 3 is a partially sectioned side view of a preferred embodiment of the link element 4. In a state opposite the pivot region 3, the link element 4 preferably has a receiving region 5 in which an axle tube 2 can be arranged on the link element 4 and in a joint region 6 (broken line) can be welded to the link element 4. In this case, the joint region 6 is preferably constructed as a recess, on the peripheral edge of which a weld seam can be produced between the link element 4 and the axle tube 2.

Figure 4:
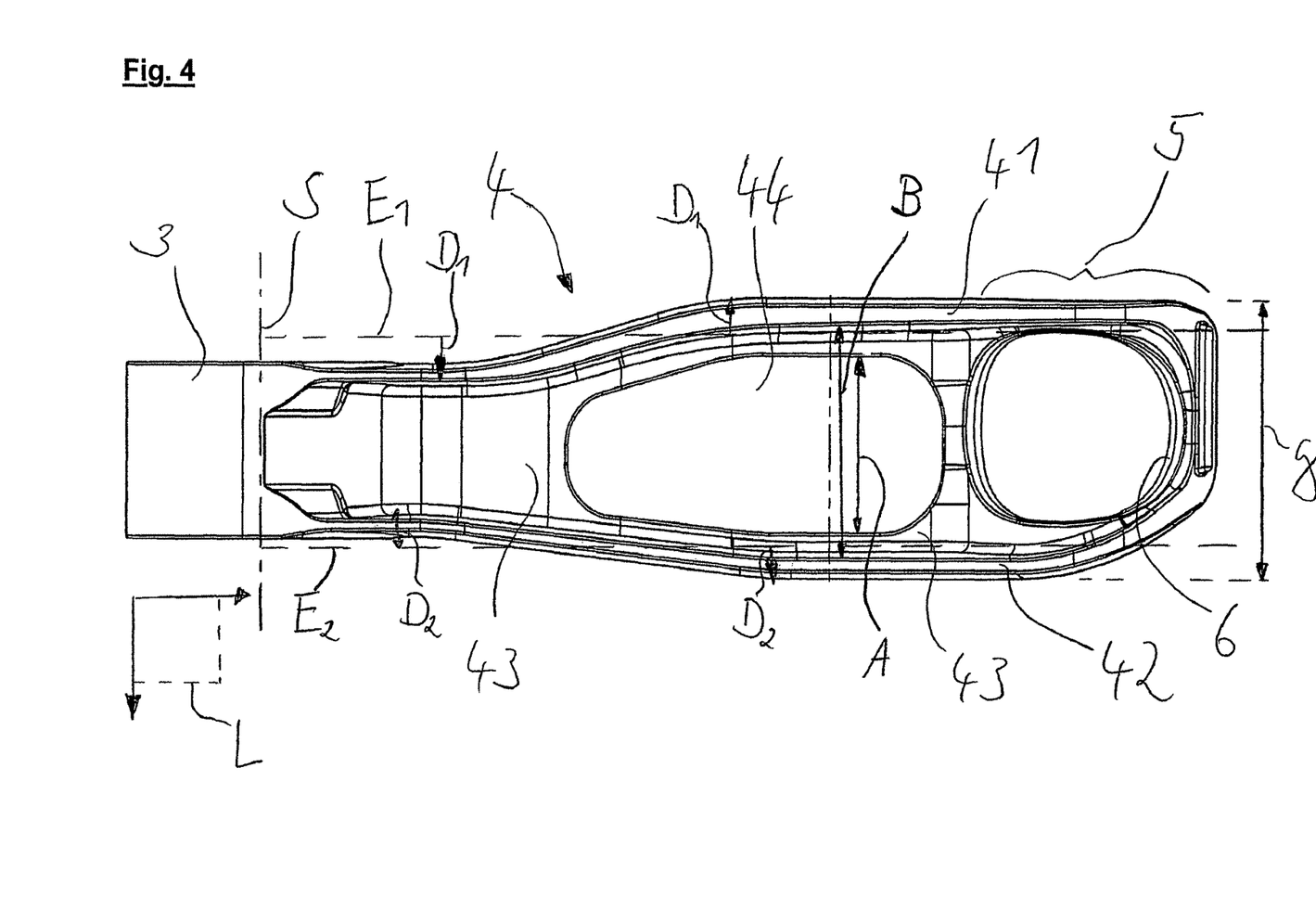
FIG. 4 is a plan view of the preferred embodiment of the link element according to the invention as shown in FIG. 3.

FIG. 4 is a plan view of a preferred embodiment of the link element 4, wherein the preferred curved shape of the first wall region 41 and the second wall region 42 is illustrated. In this case, the first wall region 41 extends substantially along a first extent plane $E_1$ which is located perpendicularly relative to the pivot axis S and with respect to the first wall region 41 so that the first maximum deviation $D_1$ or the maximum projection of the first wall region 41 from the first extent plane $E_1$ is minimized. Similarly, the second wall region 42 extends substantially along a second extent plane $E_2$ which is located perpendicularly relative to the pivot axis S and with respect to the second wall region 42 so that the second maximum deviation $D_2$ or the maximum projection of the second wall region 42 from the second extent plane $E_2$ is minimized. Preferably, the first maximum deviation $D_1$ is smaller or greater than the second maximum deviation $D_2$. In other words, consequently, the first and second wall regions 41, 42 are preferably curved to differing extents. The recess 44 of the third wall region 43 has a preferably rounded geometry which differs from the circular form. In a particularly preferred manner, the joint region 6 which is provided in the receiving portion 5 and which is constructed as a recess also has a rounded geometry which differs from the circular form. As a result of the special geometry of the recess 44 of the third wall region 43, in particular the weight of the link element 4 can be reduced because the recess 44 can be adapted in an optimum manner to the forces and moments which are intended to be trans- mitted and enough supporting material of the third wall region 43 always remains. The link element 4 preferably has a total extent G which is defined as the maximum extent thereof measured parallel with the pivot axis.

REFERENCE NUMERALS

2—Axle tube
3—Pivot region
4—Link element
5—Receiving portion
6—Joint region
41—First wall region
42—Second wall region
43—Third wall region
44—Recess
45—Upper side
46—Lower side
A—Recess extent
B—Mean wall spacing
$D_1$—First maximum deviation
$D_2$—Second maximum deviation
$E_1$—First extent plane
$E_2$—Second extent plane
G—Maximum total extent
$H_1$—First height
$H_2$—Second height
$H_3$—Third height
L—Lateral plane
Q—Transverse plane
S—Pivot axis

The invention claimed is:

1. A link element for use in utility vehicles, comprising:
a first wall region;
a second wall region; and
a third wall region;
wherein the link element has a pivot region configured for pivotable support about a pivot axis;
wherein the first wall region and the second wall region have a main extent which extends substantially parallel with a transverse plane;
wherein the transverse plane is orthogonal to the pivot axis;
wherein the third wall region protrudes substantially along a lateral plane from at least one of the first wall region and the second wall region;
wherein the lateral plane is orientated perpendicularly to the transverse plane;
wherein the third wall region is arranged eccentrically with respect to the extent of the at least one on the first wall region and the second wall region;
wherein the third wall region has a recess which extends substantially along the lateral plane; and
wherein the first wall region extends at a first height parallel with the transverse plane, wherein the second wall region extends parallel with the transverse plane at a second height, wherein the third wall region is arranged on the first wall region at from 0.1 to 0.45 times at least one of the first height and the second height.

2. The link element as claimed in claim 1, wherein the third wall region is arranged on the first wall region at from 0.15 to 0.3 times at least one of the first height and the second height.

3. The link element as claimed in claim 2, wherein the third wall region is arranged on the first wall region at from approximately 0.2 times at least one of the first height and the second height.

4. The link element as claimed in claim 1, wherein the third wall region extends at a third height parallel with the transverse plane, and wherein a ratio of the third height to at least one of the first height and second height is from 0.01 to 0.2.

5. The link element as claimed in claim 4, wherein the ratio of the third height to at least one of the first height and the second height is from 0.05 to 0.15.

6. The link element as claimed in claim 5, wherein the ratio of the third height to at least one of the first height and the second height is from 0.08 to 0.1.

7. The link element as claimed in claim 1, further comprising:
an upper side and a lower side and a receiving region configured to fix an axle tube;
wherein the upper side and the lower side are arranged on the link element in such a manner that the direction of the force acting from the axle tube on the link element extends substantially from the lower side to the upper side; and
wherein the third wall region is arranged nearer the lower side of the link element than the upper side thereof.

8. The link element as claimed in claim 1, wherein the pivot region and the wall regions are integral with one another.

9. The link element as claimed in claim 1, further comprising:
a joint region that includes an axle receiving recess configured to fix an axle tube in a materially engaging manner;
wherein the joint region is located at the end of the link element opposite the pivot region.

10. A link element for use in utility vehicles, comprising:
a first wall region;
a second wall region; and
a third wall region;
wherein the link element has a pivot region configured for pivotable support about a pivot axis;
wherein the first wall region and the second wall region have a main extent which extends substantially parallel with a transverse plane;
wherein the transverse plane is orthogonal to the pivot axis;
wherein the third wall region protrudes substantially along a lateral plane from at least one of the first wall region and the second wall region;
wherein the lateral plane is orientated perpendicularly to the transverse plane;
wherein the third wall region is arranged eccentrically with respect to the extent of the at least one on the first wall region and the second wall region;
wherein the third wall region has a recess which extends substantially along the lateral plane; and
wherein the recess has a maximum recess extent parallel with the pivot axis, wherein the first wall region and the second wall region in the region of the maximum recess extent have a mean wall spacing from each other, and wherein a ratio of the maximum recess extent to the mean wall spacing is from 0.4 to 0.9.

11. The link element of claim 10, wherein the ratio of the maximum recess extent to the mean wall spacing is from 0.6 to 0.8.

12. The link element of claim 11, wherein the ratio of the maximum recess extent to the mean wall spacing is from approximately 0.75 to approximately 0.8.

13. A link element for use in utility vehicles, comprising:
a first wall region;
a second wall region; and
a third wall region;
wherein the link element has a pivot region configured for pivotable support about a pivot axis;
wherein the first wall region and the second wall region have a main extent which extends substantially parallel with a transverse plane;
wherein the transverse plane is orthogonal to the pivot axis;
wherein the third wall region protrudes substantially along a lateral plane from at least one of the first wall region and the second wall region;
wherein the lateral plane is orientated perpendicularly to the transverse plane;
wherein the third wall region is arranged eccentrically with respect to the extent of the at least one on the first wall region and the second wall region;
wherein the third wall region has a recess which extends substantially along the lateral plane; and
wherein the first wall region at least partially has a curvature, wherein a first extent plane is arranged parallel with the transverse plane and such that a first maximum deviation of the first wall region from the first extent plane is minimized, and wherein a ratio of the first maximum deviation to a maximum total extent of the link element parallel with the pivot axis from 0.05 to 0.3.

14. The link element of claim 13, wherein the ratio of the first maximum deviation to the maximum total extent is from 0.1 to 0.3.

15. The link element of claim 14, wherein the ratio of the first maximum deviation to the maximum total extent is from approximately 0.15.

16. The link element as claimed in claim 13, wherein the second wall region partially has a curvature, wherein a second extent plane is arranged parallel with the transverse plane and such that a second maximum deviation of the second wall region from the second extent plane is minimized, and wherein a ratio of the second maximum deviation is to the maximum total extent from 0.05 to 0.3.

17. The link element of claim 16, wherein the ratio of the second maximum deviation to the maximum total extent is from 0.1 to 0.3.

18. The link element of claim 17, wherein the ratio of the second maximum deviation to the maximum total extent is from approximately 0.15.

* * * * *